United States Patent [19]

Takasaki et al.

[11] 4,349,222
[45] Sep. 14, 1982

[54] PNEUMATIC DUCT CONNECTION

[75] Inventors: Masaru Takasaki, Yokohama; Keiichiro Imatomi, Fuji, both of Japan

[73] Assignee: Nissan Motor Co., Ltd., Yokohama, Japan

[21] Appl. No.: 199,885

[22] Filed: Oct. 23, 1980

[30] Foreign Application Priority Data

Oct. 25, 1979 [JP] Japan .......................... 54-148026[U]

[51] Int. Cl.³ ............................................ F16L 21/02
[52] U.S. Cl. ..................................... 285/363; 285/382
[58] Field of Search .................. 285/382, 27, 24, 405, 285/363, 420, 424; 411/174, 172

[56] References Cited

U.S. PATENT DOCUMENTS

| 139,841 | 6/1873 | Weston | 285/382 |
|---|---|---|---|
| 790,978 | 5/1905 | Peck | 285/363 |
| 1,185,400 | 5/1916 | Hefner | 285/382 |
| 1,467,833 | 9/1923 | Bovee | 285/420 X |
| 1,917,992 | 7/1933 | Menne | 285/382 X |
| 2,062,685 | 12/1936 | Tinnerman | 411/172 X |

FOREIGN PATENT DOCUMENTS 1303043  1/1973  United Kingdom ............... 285/382

Primary Examiner—Thomas F. Callaghan
Attorney, Agent, or Firm—Thompson, Birch, Gauthier & Samuels

[57] ABSTRACT

Two loosely telescopically interconnected conduits are fastened together by a metal strip projecting from one conduit which passes through an aperture formed in the other and which is thereafter manually bent back. A foam block is disposed on the metal strip to seat against the inner wall of one of the conduits and seal the aperture through which the strip projects. A sealing ring is disposed about the mouth of conduit receiving the other to seal the gap therebetween. A second connector may be added to secure the conduits together against vibration, which second connector takes the form of first and second brackets, each attached to a conduit, and a screw receiving clip-on spring nut which clips on one of the brackets.

3 Claims, 6 Drawing Figures

PNEUMATIC DUCT CONNECTION

BACKGROUND OF THE INVENTION

1. Field of the Invention

The present invention relates generally to a pneumatic duct and more particularly to an improved connection for same which finds useful application in automotive air conditioning arrangements wherein the pneumatic ducting must be disposed and assembled in the highly restricted environment of the engine room and the area below the vehicle dashpanel.

2. Description of the Prior Art

In a known arrangement (see FIG. 1), in order to couple two conduits or ducts 10 and 12, it has been proposed to form the conduit 10 with "male" projections 14 which are snugly recieved in "female" recesses 16 defined in correspondingly shaped projections 18 formed in the conduit or duct 12. However, this arrangement has suffered from a drawback in that it is difficult to blow mould the conduits with sufficient precision to always assure the desired snug fit. Accordingly, poor joints which leak undesirable amounts of air (or the like) and which tend to separate under the influence of vehicle vibration have resulted.

SUMMARY OF THE INVENTION

The present invention features the use of a unique connection arrangement which, due to its very nature, allows for mass production tolerances inherent in blow molding and which allows the conduits to be connected together using fingertip pressure only, especially in zones wherein it is very difficult to wield a tool such as a screw driver or the like. More specifically, the invention features a clip arrangement wherein a strip of metal having a block of soft foam resin disposed thereon is fixedly connected at one end to one of the two conduits to be connected, which is inserted through an aperture in the second conduit so that the foam block seals off any leakages past the strip which is thereafter bent back via fingertip pressure to connect the two conduits.

BRIEF DESCRIPTION OF THE DRAWINGS

The features and advantages of the connection of the present invention will become more clearly appreciated from the following description taken in conjunction with the accompanying drawings in which like references denote corresponding elements, and in which.

DETAILED DESCRIPTION OF THE PREFERRED EMBODIMENTS

Figure 1:
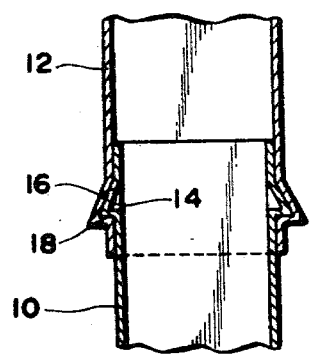
FIG. 1 is longitudinal sectional view of the prior art arrangement discussed previously under the heading of "Description of the Prior Art"
Figure 2:
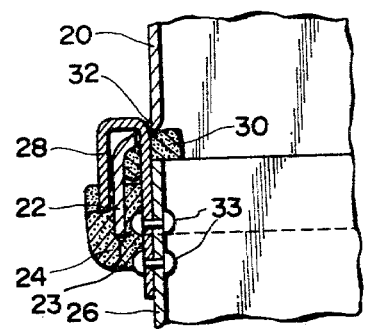
FIG. 2 is a longitudinal sectional view of a first embodiment of the present invention.
Figure 3:
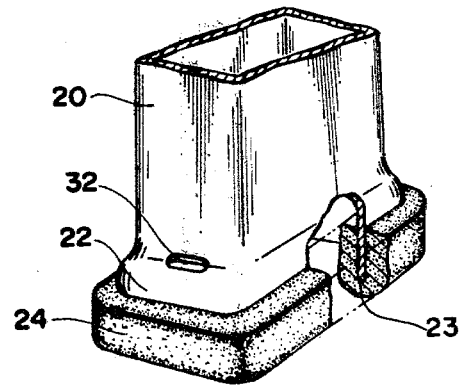
FIG. 3 is an exploded pictorial view, partially sectioned, of the first embodiment of the present invention.
Figure 3:
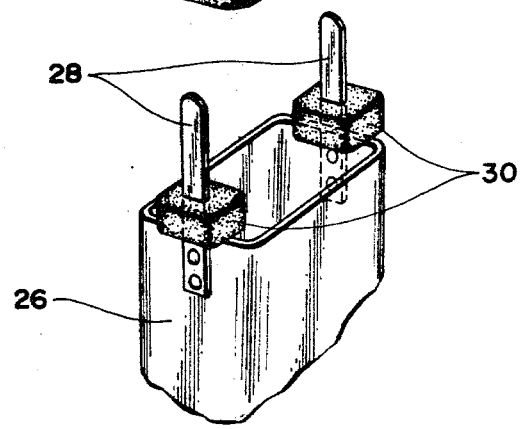

Turning now to FIGS. 2 and 3 of the drawings, a first embodiment of the present invention is shown in which the first of the conduits or ducts 20 is formed with an enlarged diameter receiving portion 22, about the mouth 23 of which is disposed a resilient seal member 24 such as polyurethane soft foamed resin, which takes up any variations in production tolerances and prevents rattling and the like. The second or mating conduit 26 is telescopically received in the first and is provided with elongate metal strips 28 and blocks of sealing material 30 (eg. polyurethane soft foamed resin) through which each of the metal strips is inserted. The enlarged receiving portion 22 of the first conduit 20 is formed with apertures 32 through which the metal strips 28 pass upon insertion of the second conduit 26 (carrying the metal strips) into the first conduit 20. The blocks of sealing material 30 disposed about the metal strips prevent any leakage through the apertures 32 through which the strips project, the metal strips thereafter being bent by fingertip pressure to curve back toward themselves to assume "U" configurations and to be compressibly received in the sealing member 24 disposed about the mouth 23 of the first conduit enlarged receiving portion 22.

As best seen in FIG. 2 the metal strips 28 are each fastened to the second conduit 26 via fasteners such as rivets 33. The sealing blocks 30 are, upon connection of the two conduits, compressed therebetween to seal the apertures 32 and limit axial movement of the two conduits relative to each other. The sealing member 24 is slightly compressed between the outer peripheral wall of the second conduit and the inner peripheral wall of the enlarged receiving portion 22, which limits radial movement of the two conduits with respect to each other. Thus, the spaced defined by the respective outer and inner diameters of the first and second conduits is sealed, while the space simultaneously allows for easy insertion of one conduit into the other during assembly of the conduits in highly confined areas.

Figure 4:
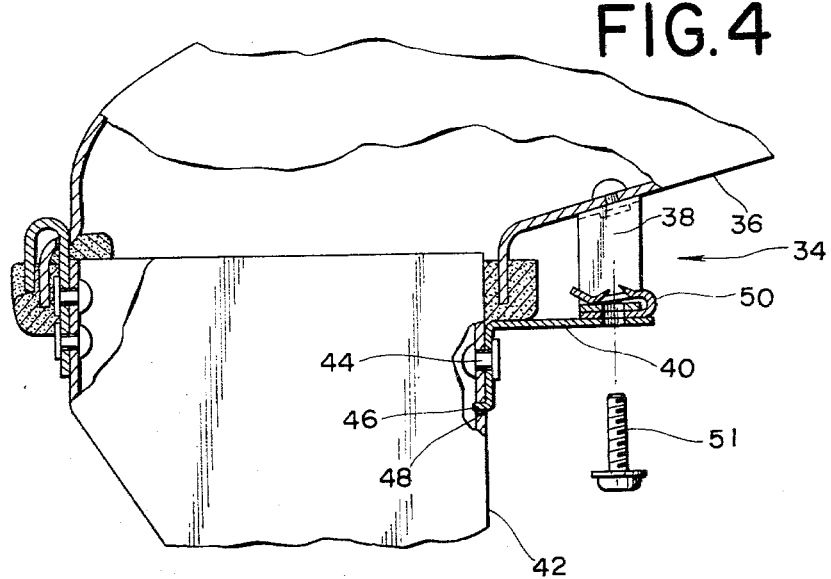
FIG. 4 is a partially sectioned view of a second embodiment of the present invention.
Figure 6:
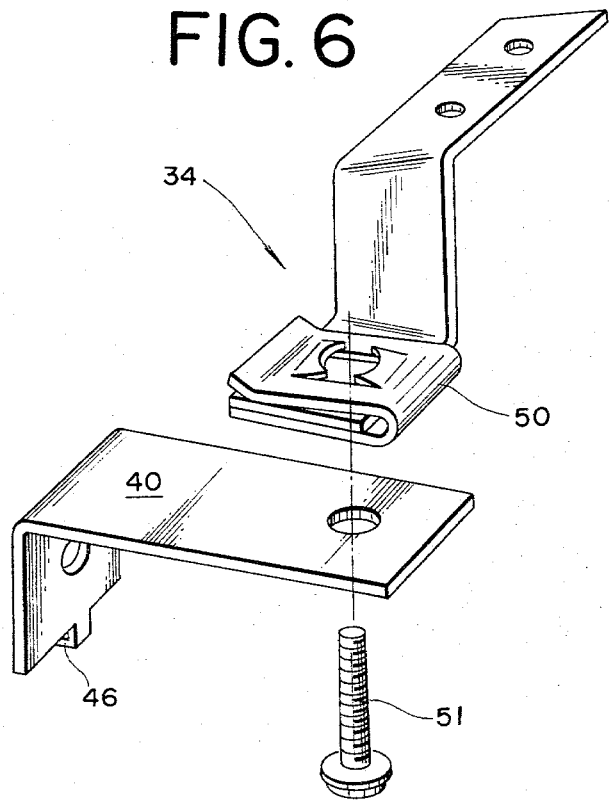
FIG. 6 is an exploded view of a fastening arrangement which in part characterizes the second embodiment of the present invention.

FIG. 4 shows a second embodiment of the present invention. This embodiment is similar to the first with the exception that one of the metal strip type fasteners is replaced with a more rigid connector 34. This connector is shown in exploded form in FIG. 6, and in this case is adpated for use with a curved conduit 36. A first bracket 38 is attached to the conduit 36 via fastening means such as blind rivets or the like. A second bracket 40 is secured to a conduit 42 by a single rivet 44, and is further provided with a flange-like locking tongue 46 received in a suitable opening 48 formed in the conduit 42. This arrangement serves to prevent the second bracket 40 from pivoting and bringing the first and second brackets out of their intended alignment. Of course, the first bracket member 38 could also be formed with a locking tongue which would eliminate the need for two securing rivets. The first and second brackets are secured together by a spring nut 50 formed as a clip, viz., the nut is formed of a flat strip which has a "U" shape, a clearance hole in one leg thereof and a thread enngaging hole in alignment therewith in the other leg. This formation allows the spring nut to be clipped onto one of the two bracket members (in the illustrated arrangement the spring nut is clipped onto the first bracket member 38) where it will remain stationary, facilitating the simple insertion of an appropriate screw 51. During assembly, it is of course advantageous to locate the connector 34 on the most accessible side of the conduits and the metal strip type fastener arrangement on the least accessible side.

The second embodiment, although possibly slightly more difficult to assemble than the first, features increased resistance to separation under the influence of vibration.

As in the first embodiment, the outer diameter of the conduit 42 is smaller than the internal diameter of the enlarged receiving portion of the conduit 36, the gap therebetween being sealed by the sealing member 24.

Figure 5:
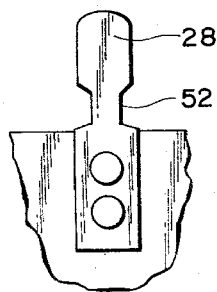
FIG. 5 is a view showing a modification of part of the fastener which characterizes the present invention.

During assembly, the conduits of the first embodiment are inserted one in the other, and the metal strips manually bent back to each assume the position shown in FIGS. 2 or 4. In order to facilitate manual bending, the strips 28 may be formed with notches 52, as illustrated in FIG. 5 which both reduce the bending effort and locate the point in which the strip will bend, hence increasing the uniformity with which the strips may be manually bent.

During assembly of the second embodiment, the conduits are telescopically inserted one in the other. The spring nut is clipped on a bracket member and the screw 51 screwed into the spring nut to fasten the bracket members together. Thereafter, the operator can reach behind the duct and manually bend the strip 28 into its locking position.

Thus in summary, the present invention features large diameter differences between the telescopically interconnectable ends of the conduits, which allows easy location of one in the other, a soft foam seal which seals the gap between the ends of the conduits and unique fasteners which may be manually or very simply fastened.

What is claimed is:

1. A pneumatic duct comprising:
   a first conduit having an enlarged diameter receiving portion formed at one end thereof and an aperture formed in said receiving portion;
   a second conduit having an external diameter smaller than the internal diameter of said receiving portion, said second conduit being telescopically inserted into said receiving portion;
   a bendable strip fixed to said second conduit to project beyond the end thereof, said strip and aperture being adapted so that upon insertion of said second conduit into said receiving portion said strip projects through said aperture and thereafter is bent to connect said first and second conduits;
   a soft resilient sealing block disposed on said strip which abuts the inner surface of said receiving portion to seal said aperture and limit the axial movement of said first and second conduits relative to each other; and
   a soft resilient sealing member disposed about the mouth of said receiving portion for sealing the gap therebetween and limiting the radial movement of said second conduit with respect to said first conduit.

2. A pneumatic duct as claimed in claim 1, further comprising:
   a connector having:
   a first bracket secured to said first conduit;
   a second bracket secured to said second conduit; and
   a spring nut adapted to be clipped on to one of said first and second bracket, said spring nut cooperating with a screw to fasten said first and second brackets together.

3. A pneumatic duct as claimed in claim 2, wherein said second bracket is fastened to said second conduit by a first bracket securing means and is further formed with a locking tongue which projects into an aperture formed in said second conduit.

* * * * *